(12) United States Patent
Ringseth et al.

(10) Patent No.: US 7,150,010 B1
(45) Date of Patent: Dec. 12, 2006

(54) UNIFICATION OF A PROGRAMMING LANGUAGE AND A DEFINITION LANGUAGE

(75) Inventors: Paul F. Ringseth, Redmond, WA (US); Jonathan E. Caves, Bellevue, WA (US); Jason J. Shirk, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 09/611,403

(22) Filed: Jul. 6, 2000

(51) Int. Cl.
*G06F 9/45* (2006.01)

(52) U.S. Cl. ..................... 717/140; 717/141

(58) Field of Classification Search ................ 717/114, 717/116, 120, 140–144, 162; 709/315, 328, 709/331, 332
See application file for complete search history.

(56) References Cited

U.S. PATENT DOCUMENTS

| | | | |
|---|---|---|---|
| 5,467,472 A * | 11/1995 | Williams et al. ............... | 707/1 |
| 5,515,536 A | 5/1996 | Corbett et al. | |
| 5,546,584 A | 8/1996 | Lundin et al. | |
| 5,842,205 A | 11/1998 | Brann | |
| 5,842,220 A | 11/1998 | De Groot et al. | |
| 5,946,489 A | 8/1999 | Yellin et al. | |
| 5,987,529 A | 11/1999 | Nakamura et al. | |
| 5,999,728 A | 12/1999 | Cable | |
| 6,070,197 A | 5/2000 | Cobb et al. | |
| 6,167,564 A | 12/2000 | Fontana et al. | |
| 6,182,024 B1 | 1/2001 | Gangopadhyay et al. | |
| 6,189,048 B1 | 2/2001 | Lim et al. | |
| 6,247,174 B1 | 6/2001 | Santhanam et al. | |
| 6,304,918 B1 | 10/2001 | Fraley et al. | |
| 6,347,342 B1 | 2/2002 | Marcos et al. | |
| 6,385,769 B1 | 5/2002 | Lewallen | |
| 6,389,491 B1 | 5/2002 | Jacobson et al. | |
| 6,408,342 B1 | 6/2002 | Moore et al. | |
| 6,510,550 B1 | 1/2003 | Hightower et al. | |
| 6,519,767 B1 | 2/2003 | Carter et al. | |
| 6,701,352 B1 | 3/2004 | Gardner et al. | |

OTHER PUBLICATIONS

Aho et al.; "Compilers Principles, Techniques, and Tools"; Addison-Wesley Publishing Company; 1988; pp. 1-78 (chapters 1-2).*
Kirtland, M., "Object-Oriented Software Development Made Simple With COM+ Runtime Services," *Microsoft Systems Journal*, vol. 12, pp. 49-59 (Nov. 1997).
Kraig Brockschmidt, *Inside OLE*, Second Edition, "Chapter 3, Type Information," Microsoft Programming Series, Microsoft Press, pp. 145-186, 1995.
Kraig Brockschmidt, *Inside OLE*, Second Edition, "Chapter 14, OLE Automation and Automation Objects," Microsoft Programming Series, Microsoft Press, pp. 635-730, 1995.
Kraig Brockschmidt, *Inside OLE*, Second Edition, "Chapter 15, OLE Automation Controllers and Tools," Microsoft Programming Series, Microsoft Press, pp. 731-760, 1995.

(Continued)

*Primary Examiner*—Kakali Chaki
*Assistant Examiner*—William Wood
(74) *Attorney, Agent, or Firm*—Klarquist Sparkman, LLP

(57) ABSTRACT

Unification of a programming language with a definition language creates a powerful tool for object-oriented programming. A programming language is extended to include definition language constructs. In a compiler environment, a compiler recognizes the definition language constructs in programming language code. The compiler environment unifies representation of the definition language information and programming language code in a unified parse tree, and derives semantic meaning from definition language information. The compiler environment also checks for lexical, syntax, and semantic errors.

20 Claims, 15 Drawing Sheets

OTHER PUBLICATIONS

Laurence Vanhelsuwé, *Mastering Java Beans*, "Chapter 7, Customizing Beans," Sybex Inc., pp. 343-404, 1997.

Richard Grimes, "Attribute Programming with Visual C++," Wrox Press, 11 pp. [online] [retrieved on Apr. 24, 2000 from www.comdeveloper.com/articles/attribprog.asp].

Al Major, *COM IDL & Interface Design*, "Chapter 1, Introduction," Wrox Press, pp. 1-7, 1999.

Al Major, *COM IDL & Interface Design*, "Chapter 2, COM and IDL Basics," Wrox Press, pp. 9-50, 1999.

Al Major, *COM IDL & Interface Design*, "Chapter 4, Automation and Tool Support," Wrox Press, pp. 103-132, 1999.

Shepherd et al., *MFC Internals*, "Chapter 14, MFC and Automation," Addison-Wesley, pp. 581-618, 1996.

Ivor Horton, *Beginning Visual C++ 6*, "Chapter 24, Using the Active Template Library," Wrox Press, pp. 1009-1063, 1998.

Microsoft Developer Network, "Using MIDL with Visual C++," 1 pp. [online] [retrieved on May 22, 2000 from http://msdn.microsoft.com/library/periodic/period96/activesidebar.htm].

Microsoft Developer Network, "The IDL File," 1 pp. [online] [retrieved on May 19, 2000 from http://msdn.microsoft.com/library/psdk/rpc/ov-tutor_2sf9.htm].

Microsoft Developer Network, "The Interface Definition Language (IDL) File," 3 pp. [online] [retrieved on May 19, 2000 from http://msdn.microsoft.com/library/psdk/rpc/ov-files_6x 9h.htm].

Microsoft Developer Network, "IDL Attributes," 16 pp. [online] [retrieved on May 19, 2000 from http://msdn.microsoft.com/library/psdk/midl/ov-iface_3dmb.htm].

Microsoft Developer Network, "C# Introduction and Overview," 4 pp. [online] [retrieved on Jun. 30, 2000 from http://www.msdn.microsoft.com/vsstudio/nextgen/technology/csharpintro.asp].

Microsoft Developer Network, excerpts from C# Language Reference and C# Programmer's Reference, 50 pp. [online] [[retrieved on Jun. 30, 2000 from http://www.msdn/microsoft.com/library/prelim/csref].

Pinheiro da Silva et al., "User Interface Modelling with UML" 15 pp.

Grundy et al., "Towards a Unified Event-based Software Architecture," SIGSOFT 96 Workshop, pp. 121-125 (1996).

Needham et al., "ADAM: A Language-Independent, Object-Oriented, Design Environment for Modeling Inheritance and Relationship Variants in ADA 95, C++, and Eiffel," pp. 99-113 (1996).

"OMG Unified Modeling Language Specification," Version 1.3, pp. i-xx, 1-1-1-15 (Jun. 1999).

Quatrani, "Visual Modeling with Rational Rose and UML," Addison Wesley Longman, Inc., 10 pp. (Apr. 1998).

"Visual C++ Technology Preview Distributed at PDC," downloaded from the World Wide Web on Aug. 27, 2003.

Fesslmeier, "C++Builder 5 Features and Benefits," *Inprise Corporation Product Marketing*, pp. 1-19 (Jan. 25, 2000).

Reisdorph et al., "Borland C++Builder 4 Unleashed," downloaded from World Wide Web on Sep. 1, 2003.

* cited by examiner

FIGURE 2a (Prior Art)

```
import "docobj.idl";

enum E {
    e = 17,
};
struct S {
    int i, j;
};

[version(1.0), helpfile("test.res"), helpcontext(12), uuid(eed3644c-8488-3ecd-ba97-147db3cdb499) ]
library MyLib
{
    importlib("stdole2.tlb");
    importlib("olepro32.dll");

[uuid(1AECC9B3-2104-3723-98B8-7CC54722C7DD), helpstring("interface ITest")]
    dispinterface ITest {
    properties:
    methods:
        [id(34)] void Grade([in] enum E , [out,retval] char *);
        [id(18)] HRESULT Score([in] struct S *a, [in] float b, [in] VARIANT c);
    };
```

```
[object, uuid(1DAD4027-2BA5-34F1-AD39-76A637E6579E), helpstring("interface ITest2")]
interface ITest2 : IUnknown {
    void __cdecl Display();
    [propput] void StudentID([in] int );
    [propget] void StudentID([out,retval] int *);
    HRESULT Hours([in] int , [in] float );
};                                                                              ⎬ 230

[uuid(12341234-1234-1234-1234-123412341234), version(1.0), helpstring("interface CTest")]
coclass CTest {
    dispinterface ITest;
    interface ITest2;
};                                                                              ⎬ 250
```

200

```
#define _ATL_ATTRIBUTES 1
#include "atlbase.h"
#include "atlcom.h"
extern "C" int printf(const char*, ...);

// IDL library block and overall project settings
[project(type=dll, name=MyLib, helpfile="test.res", helpcontext=12)];

[export] enum E {
    e = 17
};
[export] struct S {
    int i, j;
};

[dispinterface, helpstring("interface ITest")] __interface ITest : IDispatch {
    [id(34)] void Grade([in] E, [out, retval] char*);
    [id(18)] HRESULT Score([in]S* a, [in]float b, [in]VARIANT c);
};

[object, library_block, helpstring("interface ITest2")] __interface ITest2 {
    void __cdecl Display(void);
    [propput] void StudentID([in] int);
    [propget] void StudentID([out,retval] int*);
    HRESULT Hours([in]int, [in]float);
};
```

600 → (entire block)
610 → project line
620 → enum/struct block
630 → ITest interface
640 → ITest2 interface To Figure 6b →

```
[coclass, progid(CTest.17), helpstring("interface CTest"), uuid(12341234-1234-1234-1234-123412341234)]
struct CTest : ITest, ITest2 {
    void Grade(E e, char* pc) {
        printf("CTest::Grade(e = %d)\n", (int) e);
        *pc = 'A';
    }
    HRESULT Score(S* a, float b, VARIANT c) {
        printf("CTest::Score(a = %p,b = %f,c = %d)\n", a, b, c.lVal);
        return S_OK;
    }
    void Display() {
        printf("CTest::Display()\n");
    }
    void put_StudentID(int i) {
        printf("CTest::put_StudentID(i = %d)\n", i);
    }
    void get_StudentID(int* ) {
        printf("CTest::get_StudentID()\n");
    }
    HRESULT Hours(int a, float b) {
        printf("CTest::Hours(a = %d,b = %f)\n", a, b);
        return S_OK;
    }
};
```

600
650
660

```
[coclass, progid(CTest.17), helpstring("interface CTest"), uuid(12341234-1234-1234-1234-123412341234)]
struct CTest : ITest, ITest2 ,
    /* + + + Added Baseclass */ public CComCoClass<CTest, &__uuidof(CTest)>,
    /* + + + Added Baseclass */ public CComObjectRootEx<CComSingleThreadModel>,
    /* + + + Added Baseclass */ public IProvideClassInfoImpl<&__uuidof(CTest)>
{
    void Grade(E e, char* pc) {
        printf("CTest::Grade(e = %d)\n", e);
        *pc = 'A';
    }
    HRESULT Score(S* a, float b, VARIANT c) {
        printf("CTest::Score(a = %p,b = %f,c = %d)\n", a, b, c.iVal);
        return S_OK;
    }
    void Display() {
        printf("CTest::Display()\n");
    }
    void put_StudentID(int i) {
        printf("CTest::put_StudentID(i = %d)\n", i);
    }
    void get_StudentID(int* ) {
        printf("CTest::get_StudentID()\n");
    }
    HRESULT Hours(int a, float b) {
        printf("CTest::Hours(a = %d,b = %f)\n", a, b);
        return S_OK;
    }
};
```

```
// +++ Start Injected Code
virtual HRESULT STDMETHODCALLTYPE Invoke(
    /* [in] */ DISPID dispIdMember,
    /* [in] */ REFIID riid,
    /* [in] */ LCID lcid,
    /* [in] */ WORD wFlags,
    /* [out][in] */ DISPPARAMS *pDispParams,
    /* [out] */ VARIANT *pVarResult,
    /* [out] */ EXCEPINFO *pExcepInfo,
    /* [out] */ UINT *puArgErr)
{
    HRESULT hr = S_OK;
    if (pDispParams == 0) {
        return DISP_E_BADVARTYPE;
    }
    if (pVarResult != 0) {
        VariantInit(pVarResult);
    }
    switch (dispIdMember) {
        case 18:
        {
            S * i1 = (S*) V_RECORD(&pDispParams->rgvarg[2]);
            float i2 = V_R4(&pDispParams->rgvarg[1]);
            VARIANT i3 = pDispParams->rgvarg[0];
```

FIGURE 9b

```
hr = Score(i1, i2, i3);
if (pVarResult != 0) {
    V_VT(pVarResult) = VT_ERROR;
    V_ERROR(pVarResult) = hr;
}
break;
}
case 34:
{
    E i1 = (E) V_I4(&pDispParams->rgvarg[1]);
    char* i2 = (char*) V_I1REF(&pDispParams->rgvarg[0]);
    Grade(i1, i2);
    if (pVarResult != 0) {
        V_VT(pVarResult) = VT_UI1 | VT_BYREF;
        V_I1REF(pVarResult) = (char*) i2;
    }
    break;
}
default:
    return DISP_E_MEMBERNOTFOUND;
}
return hr;
}
```

FIGURE 9d

```
virtual HRESULT STDMETHODCALLTYPE GetIDsOfNames(
    /* [in] */ REFIID riid,
    /* [size_is][in] */ LPOLESTR *rgszNames,
    /* [in] */ UINT cNames,
    /* [in] */ LCID lcid,
    /* [size_is][out] */ DISPID *rgDispId)
{
    static LPOLESTR names[] = { L"Grade", L"Score" };
    static DISPID dids[] = { 34, 18 };
    for (unsigned int i = 0; i < cNames; ++i) {
        int fFoundIt = 0;
        for (unsigned int j = 0; j < sizeof(names)/sizeof(LPOLESTR); ++j) {
            if (lstrcmpW(rgszNames[i], names[j]) == 0) {
                fFoundIt = 1;
                rgDispId[i] = dids[j];
            }
        }
        if (fFoundIt == 0) {
            return DISP_E_UNKNOWNNAME;
        }
    }
    return S_OK;
}
```

```
virtual HRESULT STDMETHODCALLTYPE GetTypeInfoCount(unsigned int* pctinfo)
{
    if (pctinfo == NULL) {
        return E_POINTER;
    }

CComPtr<ITypeInfo> spTypeInfo;
    *pctinfo =
        (SUCCEEDED(TypeInfoHelper(__uuidof(ITest), 0, &spTypeInfo))) ? 1 : 0;
    return S_OK;
} virtual HRESULT STDMETHODCALLTYPE GetTypeInfo(unsigned int iTInfo, LCID lcid, ITypeInfo** ppTInfo)
{
    if (iTInfo != 0) {
        return DISP_E_BADINDEX;
    } return TypeInfoHelper(__uuidof(ITest), lcid, ppTInfo);
}
// +++ End Injected Code
.................................
};
```

UNIFICATION OF A PROGRAMMING LANGUAGE AND A DEFINITION LANGUAGE

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright© 2000, Microsoft Corporation, All Rights Reserved.

TECHNICAL FIELD

The present invention pertains to unifying a programming language with a definition language. In a compiler environment, a compiler recognizes definition language constructs embedded in programming language source code, creates a parse tree that unifies representation of the definition language and programming language, and generates output code based upon the semantics of the definition language and programming language.

BACKGROUND OF THE INVENTION

A complex computer program can contain millions of lines of code. To manage this complexity, many programmers have adopted object-oriented programming techniques. Object-oriented programming splits a computer program into modules called objects. Each object performs specific functions and interacts with other objects in a pre-defined way. Conventionally, programmers use a definition language to create a specification for an object. This definition language specification defines how the object interacts with other objects. With reference to this definition language specification, programmers then use a programming language to actually write code for the object.

FIG. 1 shows several principles of object-oriented programming with reference to an object 100 that interacts in pre-defined ways with a client 140 (which can also be an object).

The object 100 encapsulates data 110, which indicates the current state of the object 100. The object 100 exposes member functions 120, 122, and 124 that provide access to data 110 or provide some other defined function. To access the data 110, the client 140 of the object 100 goes through a member function. In FIG. 1, the member functions 120, 122, 124 perform related services for the client 140, and are grouped into an interface 126. In some object-oriented programming models, an object can expose multiple interfaces. For example, FIG. 1 also includes an interface 130 (shown without member functions for simplicity).

A particular member function might take arguments as input and/or produce arguments as output. An argument can be, for example, a number, a character, a string of characters, a user-defined data structure, or a pointer. To interact with an object exposing a member function, a client gives arguments of the correct type and in the correct order. The object processes the data for the input arguments according to the member function, and then returns output arguments of the correct type in the correct order. A definition language specification for the object 100 defines how the object 100 and client 140 interact, for example, what arguments to exchange, what order to exchange them, etc. The client 140 and the object 100 interact per the definition language specification, after a programmer has written programming language code to implement the client 140 and the object 100 according to the definition language specification.

Definition languages have evolved to precisely specify information about interfaces, the member functions of interfaces, and the objects that expose interfaces. A definition language for interfaces is commonly termed an interface definition language ["IDL"]. Historically, interface definition languages have sometimes been termed object definition languages or object description languages.

FIGS. 2a and 2b show a source code listing of an IDL file 200 for an object CTest that exposes the interfaces ITest and ITest2. The IDL portion 210 indicates that ITest has methods Grade and Score, and indicates data types for the input and output arguments of Grade and Score. The IDL portion 230 defines ITest2, which includes the methods Display and Hours as well as methods to retrieve and set a value for the property StudentID. The IDL portion 250 describes an object CTest that exposes the ITest and ITest2. This IDL file shows the complexity and intricacy of specifying interfaces with IDL. For more information about the IDL used in IDL file 200, see Kraig Brockschmidt, *Inside OLE*, second edition, "Chapter 3, Type Information," Microsoft Press (1995) or Al Major, *COM IDL & Interface Design*, Wrox Press (1999).

Conventionally, an IDL defines interfaces and objects, while a programming language is used to implement the interfaces for an object according to the IDL specification for the object. IDLs have developed separately from programming languages, follow different rules, and use different tools.

FIG. 3 illustrates separate treatment of IDL and programming language code in a "build process" for creating a binary file 380. In FIG. 3, an IDL file 300 includes an IDL specification for an object and the interfaces of the object. An IDL compiler 310 converts the IDL file 300 to output code such as a type library file 320 describing information types for the interfaces. The IDL compiler 310 also produces a header file 330 for consumption by the C++ compiler 350.

A C++ source code file 340 includes statements in the programming language C++. In this example, the C++ file 340 is for implementing a class that exposes the interfaces defined in the IDL file 300. The C++ compiler 350 converts the C++ file 340 to the output code 360. The C++ compiler uses the header file 330 when converting the C++ source code to the output code 360. The type library is packaged in a RC file 324, from which a resource compiler 326 produces a RES file 328 that is passed to the linker 370. The linker 370 packages the RES file 328 together with the output code 360 and any other appropriate resources into a binary file 380 such as an executable or dynamic link library.

Separate treatment of IDL and programming language code has several disadvantages.

First, when an IDL compiler converts IDL to output code, the IDL compiler strips most IDL information. This stripped IDL information is unavailable to a programming language compiler subsequently receiving the output code, which prevents the programming language compiler from fully utilizing combined knowledge of IDL and programming language code.

Second, separately handling IDL and programming language code complicates programming by requiring separate files and more code from a programmer, and by using different rules and tools.

Third, inconsistencies between IDL files and programming language files can create bugs when a project is being built. Worse yet, run time inconsistencies between programming language code and corresponding IDL can cause a program to inexplicably crash.

Microsoft Corporation's Visual C++ 5.0 and 6.0 provide development tools that somewhat simplify separate treatment of IDL. In Visual C++ 6.0, a "ClassWizard" development tool allows a programmer to add features to an object by manipulating a high level representation of the object. When a programmer adds a feature, IDL is automatically generated and added to a separate IDL file. For more information about development tools that facilitate separate treatment of IDL code and C++ code, see Sphar et al., *Learn Microsoft Visual C++ 6.0 Now*, Microsoft Press (1998) or Horton, *Beginning Visual C++ 6*, Wrox Press Ltd. (1998).

These development tools still involve an IDL compiler that converts IDL to output code, stripping most IDL information in the process. A programming language compiler that later handles the output code cannot utilize this lost information. Moreover, although these development tools simplify the separate handling of IDL and programming language code in many respects, they still expose the programmer to separate programming language and IDL files.

Other programming tools recognize selected, limited forms of IDL information in programming language source code. These programming tools typically process the IDL information, pass it through to an output file as IDL metadata, and then discard the IDL information. These tools do not derive any semantic meaning from the IDL information.

For example, Microsoft Corporation's Visual J++ allows placement of IDL attributes of selected, limited types in comments in Java source code. A pre-processor strips away the comments, but preserves the IDL attributes. Later, a compiler passes the IDL information through to an output file as IDL metadata. The compiler does not derive semantic meaning from the IDL information, and fails to fully utilize combined knowledge of IDL and programming language code.

SUMMARY OF THE INVENTION

The present invention overcomes these problems by unifying a programming language with a definition language. This unification creates a powerful tool for object-oriented programming.

A programming language is extended to include constructs for a definition language. This simplifies programming by providing an intuitive, easy to use, and systematic way to write programs with definition language semantics. A programmer places definition language constructs in a programming language file, writing less code and saving time and money. The combined definition language and programming language uses a single set of rules, which simplifies editing and understanding a file.

In a compiler environment, a compiler for the programming language with embedded definition language information recognizes the definition language constructs. The compiler environment unifies representation of the definition language and programming language, and utilizes definition language information which otherwise would be stripped by a definition language compiler. This enables powerful object-oriented programming capabilities within the compiler environment.

The compiler environment checks for errors in the definition language information and programming language code, and checks for errors caused by inconsistency between definition language information and programming language code. Catching errors during development prevents unexplained crashes at run time. In addition, the compiler environment makes the build process more robust, improves error handling, and simplifies debugging during development.

Processing definition language information along with the programming language code simplifies and speeds up the build process. A programmer prepares a single file, and the compiler outputs a single file from which a linker creates an appropriate binary file.

Additional features and advantages of the invention will be made apparent from the following detailed description of an illustrative embodiment that proceeds with reference to the accompanying drawings.

BRIEF DESCRIPTION OF THE DRAWINGS

FIGS. 2a and 2b are a listing for an IDL file according to the prior art.

FIGS. 6a and 6b are a source code listing for a file having C++ source code with embedded IDL information describing the software object of FIG. 5.

FIGS. 9a–9f are a source code listing representative of the output of the compiler of FIG. 7 upon processing the source code listing of FIGS. 6a and 6b.

DETAILED DESCRIPTION OF AN ILLUSTRATIVE EMBODIMENT

The illustrative embodiment of the present invention is directed to unifying an interface definition language ["IDL"] with the C++ programming language. This unification enables powerful interface-based programming capabilities in a C++ compiler environment.

The C++ language is extended to include IDL constructs. In the C++ compiler environment, a C++ compiler recognizes the IDL constructs. The C++ compiler environment unifies representation of the embedded IDL and C++ code in a parse tree, and utilizes marshaling, type, and interface information in the IDL which otherwise would be stripped by an IDL compiler. For example, the C++ compiler environment can determine which arguments of an interface are "in," "out," or "retval" arguments, determine dispatch interface information such as dispids, or determine whether an interface is late or early bound (viz., dispinterface or custom/dual).

The C++ compiler environment derives semantic meaning from the IDL embedded in C++ code, which enables powerful interface-based programming capabilities. For example, the C++ compiler can automatically generate an implementation for a dispatch interface using an extremely clean and sparse syntax. The C++ compiler can also automatically generate code for a client-side dispatch interface call site, which greatly simplifies programming.

In alternative embodiments, the present invention uses a programming language other than C++ or definition language information expressed in a language other than COM IDL. The programming language can be any language that allows a programmer to express computer processing instructions for an object in a symbolic manner largely independent of machine-specific details. The definition language information can be any type of declarative information that describes an object or an interface exposed by an object.

Although the illustrative embodiment describes COM, alternative embodiments treat other object models. In general, an object model is a set of conventions governing how objects are structured and interact with other objects.

Instead of a C++ compiler environment, alternative embodiments use other programming environments that derive semantic meaning from definition language information embedded in programming language code. A programming environment includes one or more development tools used to develop objects.

For example, in one alternative embodiment, a Java compiler environment facilitates the creation of Java objects (e.g., JavaBeans) that are coded in Java with embedded Java IDL. In another alternative embodiment, a programming environment facilitates the creation of CORBA-compliant objects described in programming language code with embedded CORBA IDL.

In general, the present invention can be applied to any software object for which programming language code includes definition language constructs.

I. Exemplary Computing Environment

Figure 4:
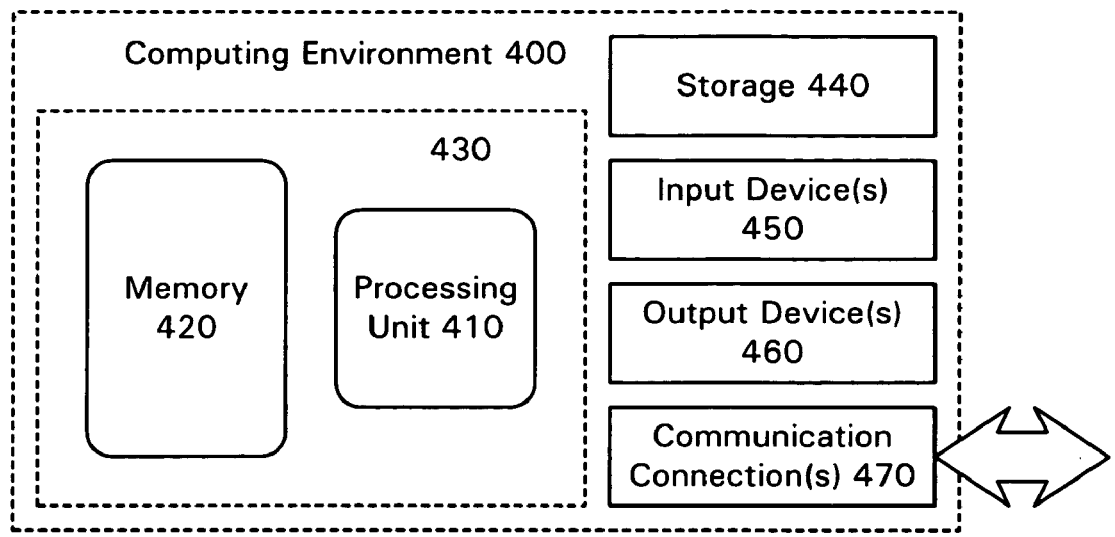
FIG. 4 is a block diagram of a computing environment in which the illustrated embodiment can be implemented.

FIG. 4 illustrates a generalized example of a computing environment 400 in which the illustrative embodiment may be implemented. Computing environment 400 is not intended to suggest any limitation as to scope of use or functionality of the invention, as the present invention may be implemented in diverse general purpose or special purpose computing environments.

With reference to FIG. 4, computing environment 400 includes at least one processing unit 410 and memory 420. In FIG. 4, this most basic configuration is included within dashed line 430. The processing unit 410 executes computer executable instructions and may be a real or a virtual processor. In a multi-processing system, multiple processing units execute computer executable instructions to increase processing power. The memory 420 may be volatile memory (e.g., registers, cache, RAM), non-volatile memory (e.g., ROM, EEPROM, flash memory, etc.), or some combination of the two.

A computing environment may have additional features. For example, the computing environment 400 includes storage 440, one or more input devices 450, one or more output devices 460, and one or more communication connections 470. A bus, controller, network, or other interconnection mechanism (not shown) interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, DVDs, or any other medium which can be used to store information and which can be accessed within the computing environment 400.

An input device 450 may be a touch input device such as a keyboard, mouse, pen, or trackball, a voice input device, a scanning device, or another device that provides input to the computing environment 400. An output device 460 may be a display, printer, speaker, or another device that provides output from the computing environment 400.

A communication connection 470 enables communication over a communication medium to another computing entity. The communication medium conveys information such as computer executable instructions or other data in a modulated data signal. A modulated data signal is a signal that has one or more of its characteristics set or changed so as to encode information in the signal. By way of example, communication media include wired or wireless techniques, techniques implemented with an electrical, optical, RF, infrared, acoustic, or other carrier, and combinations of the above.

The invention can be described in the context of computer readable media. Computer readable media are any available media that can be accessed within a computing environment. With the computing environment 400, for example, computer readable media include the memory 420, the storage 440, the communication media, and combinations of the above.

The invention can be described in the context of computer executable instructions (such as those included in program modules) being executed in a computing environment on a target real or virtual processor. Generally, program modules include routines, programs, libraries, objects, classes, components, data structures, etc. that perform particular tasks or implement particular abstract data types. The functionality of program modules may be combined or split between program modules as desired in various embodiments. Computer executable instructions for program modules may be executed within a local or distributed computing environment.

II. Definition Language Information Embedded in Source Code

According to the illustrated embodiment, IDL constructs are embedded in C++ code. The embedded IDL information provides interface definitions and type information for an object, as well as marshaling information. The embedded IDL information includes information that would conventionally be stripped by an IDL compiler.

In alternative embodiments, instead of COM IDL information, the definition language information is Java IDL information, CORBA IDL information, or another type of declarative information that describes an object or an interface of an object. Moreover, the programming language can be Java, C, Basic, or another programming language that allows a programmer to express computer processing instructions for an object in a symbolic manner largely independent of machine-specific details.

Embedded IDL constructs are identified by brackets "[" and "]" marking the beginning and end of a set of one or more IDL attributes, respectively. The set of IDL attributes along with brackets is termed an IDL attribute tag. Embedded IDL in C++ source code for a function declaration Grade of a dual interface ITest is:

[dual, uuid(12341234-1234-1234-1234-123412341234)]_interface ITest {
   [id(1), propget] HRESULT Grade([in] int x, [out, retval] BSTR* pb);
};

The IDL attribute "dual" annotates the interface ITest. In general, an IDL attribute tag can be attached to any C++ programming construct, including an entire block or program. Table 1 lists some representative forms.

TABLE 1

| C++ Construct | Sample |
|---|---|
| Program (anonymous) | [IDLattr]; |
| Block | [IDLattr] { <statements> } ] |
| Class | [IDLattr] struct A |
| Interface | [IDLattr] interface ITest |
| Function | [IDLattr] void Grade |
| Function argument | void Grade ([IDLattr] int n) |
| Variable | [IDLattr] int n |

An example of IDL attribute-tag syntax is:

[IDLattr1, IDLattr2=val1, IDLattr3(val2), IDLattr4(prop1=val3, prop2=val4), IDLattr5(val5,val6,prop3=val7, prop4={val8,val9})={val10,val11}].

Within the paired brackets denoting an IDL attribute tag, a first IDL attribute has only a name. A second IDL attribute is set equal to a specific value. A third IDL attribute has a value passed to it as an argument, which is equivalent to the second form. A fourth IDL attribute contains a list of properties set to specific values. The last IDL attribute illustrates a parameter list containing values, properties set to individual values, and a property set to a list of values. Finally, a parameterized IDL attribute itself is set to a list of values. Commas separate multiple attributes in a single tag.

Figure 1:
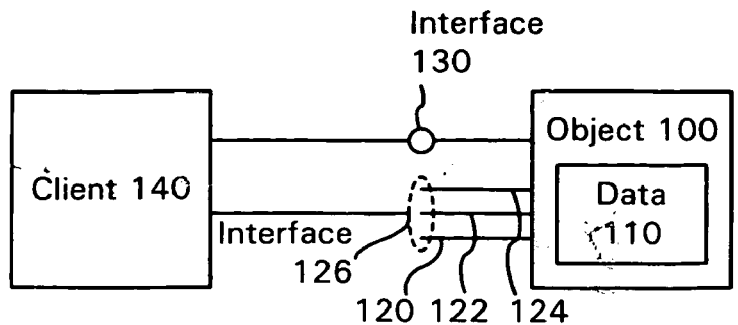
FIG. 1 is a block diagram of a software object and a client that interact across interfaces of the software object according to the prior art.
Figure 3:
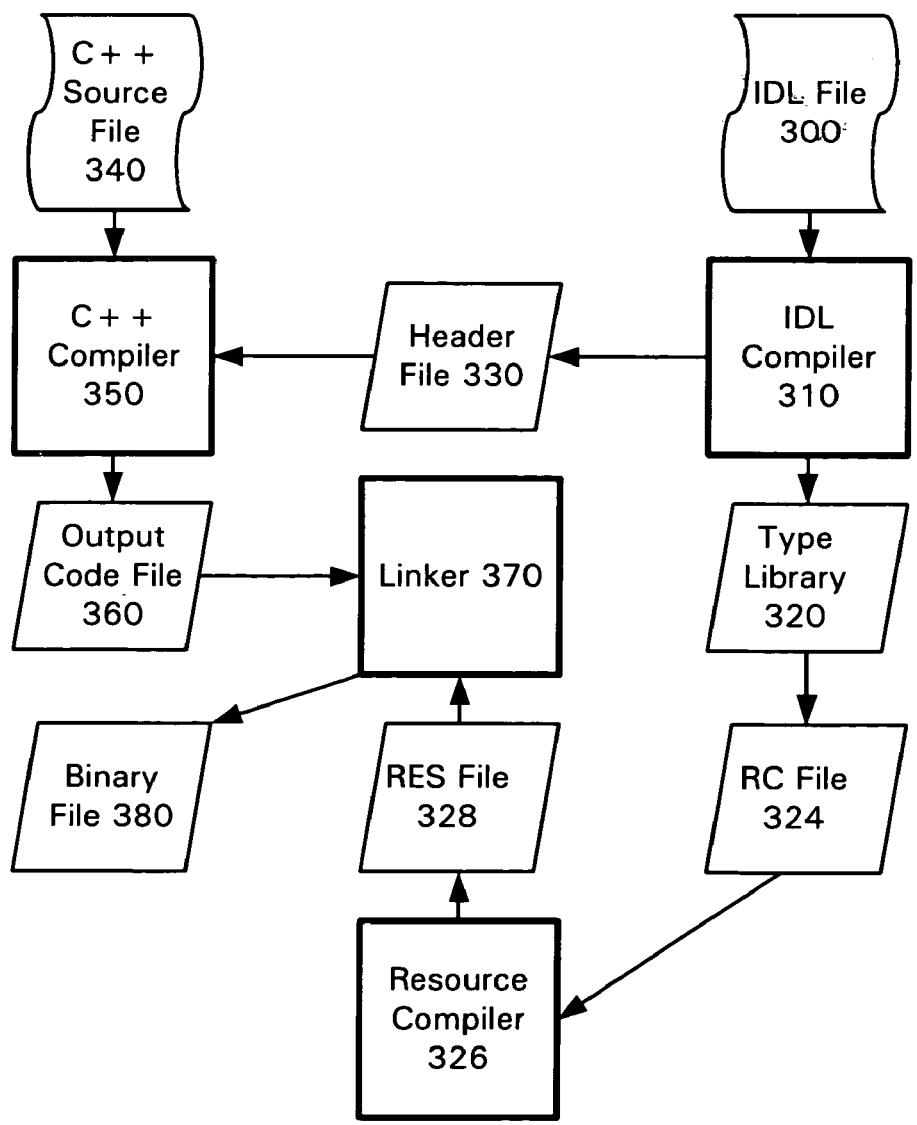
FIG. 3 is a block diagram of a programming language compiler, an IDL compiler, and a linker that create a binary file according to the prior art.
Figure 2B:
Figure 5:
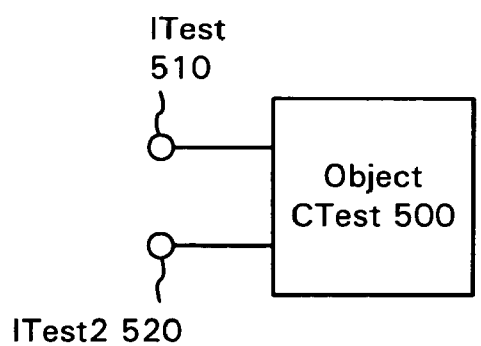
FIG. 5 is a block diagram of a software object described in the source code listings of FIGS. 6a and 6b.

FIG. 5 illustrates an example of an object CTest 500 that exposes the interfaces ITest 510 (defined in the code portion 630 of FIG. 6a) and ITest2 520 (defined in the code portion 640 of FIG. 6b). The interface ITest 510 is a dispatch interface that includes methods for invoking the methods Grade and Score. The interface ITest2 includes the methods Display and Hours, as well as methods for retrieving and setting the property StudentID. The object 500 and interfaces 510 and 520 are defined and implemented with a file 600 having C++ source code with embedded IDL that is shown in FIGS. 6a and 6b. The embedded IDL in the file 600 roughly corresponds to the IDL presented in FIGS. 2a and 2b. Alternatively, different IDL tags or different programming language constructs can convey equivalent definition information.

The file 600 includes both definitions and implementations of the interfaces ITest 510 and ITest2 520 of the object CTest 500. To facilitate this integration, the usage of embedded IDL is made to be as close as possible to the usage of conventional IDL. For IDL constructs that do not map cleanly to C++, however, deviation from conventional IDL usage is required. Except where otherwise indicated below, embedded IDL constructs are used as in conventional IDL.

The file 600 includes numerous embedded IDL constructs. For example, the code portion 610 includes a construct with the embedded IDL attribute "project." Rather than use the conventional IDL library block construct in C++, a global anonymous "project" attribute specifies type library characteristics, including type (e.g., dll or executable), name, helpfile, and helpcontext.

The code portion 620 includes two examples of the IDL attribute "export." User-defined data types (struct, enum, union, etc.) that should be visible to embedded IDL are annotated with the "export" attribute. In conventional IDL, these user-defined types were separately specified in an IDL file.

The code portion 630 includes IDL attributes for an interface, for interface member functions, and for arguments. The new keyword "_interface" marks an interface. The "_interface" keyword semantically is a struct which contains pure virtual function members (virtual function members for which no implementation is specified that must be overridden in a derived class in order to create an object). When an interface is annotated with one of the IDL attributes "object," "dispinterface," or "dual," the interface becomes a COM interface (i.e., one that is compliant with Microsoft Corporation's Component Object Model ["COM"]). Accordingly, methods are standard call (_stdcall) by default (and any virtual overrides will also be _stdcall by default). The interface is visible to embedded IDL within it. If a COM interface is specified with no base class, then "object" causes inheritance from IUnknown, whereas "dual" and "dispinterface" cause inheritance from IDispatch. For more information about COM and the IDispatch interface, see Kraig Brockshmidt, *Inside OLE*, second edition, Chapters 14 and 15, Microsoft Press (1995). In alternative embodiments, the objects described with embedded definition language information conform to another object model or expose other types of interfaces.

The code portion 630 includes IDL attributes that annotate the interface ITest. ITest is defined as a dispinterface with a helpstring "interface ITest." The code portion 630 also includes embedded IDL attributes for member functions of ITest. Since ITest is a dispinterface, member functions are given dispids with the "id" IDL attribute. Arguments for member functions are annotated with directional IDL attributes "in," "out," and "retval."

The code portion 640 includes IDL attributes that annotate the interface ITest2. The "object" IDL attribute indicates ITest2 is a standard COM interface. ITest2 has an associated character helpstring "interface ITest2." The "library_block" IDL attribute indicates that ITest2 should be defined within the library block rather than outside the library block. In contrast, as a dispinterface, ITest is always defined in the library block. The "propput" and "propget" IDL attributes mark interface members as responsible for setting and retrieving a property value StudentID, respectively. Again, directional IDL attributes "in," "out," and "retval" annotate arguments.

The code portion 650 includes IDL attributes that annotate the object CTest. The IDL attribute "coclass" annotates the struct CTest as a COM class. Compared to conventional usage, the illustrated embodiment uses a "coclass" IDL attribute to annotate a C++ struct rather than have a coclass definition in an IDL file. The code portion 650 also includes a "helpstring" IDL attribute and a "uuid" IDL attribute. The "uuid" IDL attribute provides a 128-bit unique identifier for the coclass. The "uuid" IDL attribute can mark other declarations, including interfaces and modules. The "progid" IDL attribute specifies a version dependent alias CTest.17 for the uuid. In the registry, the alias CTest.17 will point to the uuid for CTest. If a uuid, progid, vi_progid, or version is needed for a declaration but not specified, one will be automatically generated in a reproducible fashion.

Finally, the code portion 660 includes implementation code in C++ for the coclass CTest that exposes ITest and ITest2.

As noted above, the illustrated embodiment introduces or changes the usage of several IDL attributes. These special case IDL attributes typically deviate from conventional IDL usage because of C++ incompatibility. Table 2 explains the usage and significance of these special case IDL attributes.

TABLE 2

| IDL attribute | Usage and significance |
|---|---|
| coclass | A class implementing interfaces is annotated with the "coclass" IDL attribute and is thus visible as a conventional IDL coclass. In conventional IDL usage, a separate IDL file includes the coclass definition. |
| cpp_quote | The "cpp_quote" IDL attribute maps to its IDL counterpart in a generated IDL file. In conventional IDL, cpp_quote is a preprocessor directive. |
| emitidl | By default, the compiler emits IDL metadata to output files. If "emitidl" is set to false, the compiler does not emit IDL information. |
| export | A user-defined data type annotated with the "export" IDL attribute is visible as a conventional IDL type definition. In conventional IDL, a separate IDL file includes these user-defined type definitions. |
| idl_module | The "idl_module" IDL attribute is used to import a module such as a dynamic link library in a manner analogous to the conventional IDL attribute "module." |
| idl_quote | An IDL attribute marked with the "idl_quote" IDL attribute passes through the compiler as IDL metadata. This allows the compiler to handle new IDL attributes for which the compiler lacks full support. |
| import | The "import" IDL attribute maps to its IDL counterpart in a generated IDL file. In conventional IDL, import is a preprocessor directive. |
| importidl | The "importidl" IDL attribute automates the determination of whether to import an IDL file to the top of a file or to the beginning of a library block, or to place parts of the IDL file in both. |
| importlib | The "importlib" IDL attribute maps to its IDL counterpart in a generated IDL file. In conventional IDL, importlib is a preprocessor directive. |
| include | The "include" IDL attribute maps to its IDL counterpart in a generated IDL file. In conventional IDL, #include is a preprocessor directive. |
| includelib | The "includelib" IDL attribute places an imported IDL at the beginning of a library block rather than at the top of a file. This facilitates importation of legacy IDL files. |
| library_block | The "library_block" IDL attribute annotates an interface, struct, enum, etc. to define the annotated feature inside the library block. Otherwise, the annotated feature is defined outside the library block with other marshaling-related information, which may cause an error in some situations. |
| pragma | The "pragma" IDL attribute maps to its IDL counterpart in a generated IDL file. In conventional IDL, pragma is a preprocessor directive. |
| progid | The "progid" IDL attribute allows specification of an alias for a CLSID. In conventional usage, a registry script specifies progid. |
| project | The "project" IDL attribute specifies type library characteristics. In conventional IDL, the block annotated with the attribute "library" includes information used to generate a type library. |
| satype | The "satype" IDL attribute specifies a type for a SAFEARRAY. For example, satype(BSTR) signifies a SAFEARRAY of BSTRs. |
| threading | The "threading" IDL attribute specifies a threading model to be used for a file. In conventional usage, a registry script specifies the threading model. |
| vi_progid | The "vi_progid" IDL attribute allows specification of a version independent progid. This vi_progid remains the same as the progid changes between versions. In conventional usage, a registry script was used to update vi_progid to point to the latest progid. |

Aside from the IDL attributes presented in Table 2, the illustrated embodiment supports numerous attributes in a manner analogous to conventional usage. Table 3 presents these IDL and ODL attributes. For more information on the usage of these attributes, see Al Major, *COM IDL & Interface Design*, Wrox Press (1999).

TABLE 3

| IDL Attributes | | | | ODL Attributes |
|---|---|---|---|---|
| appobject | helpfile | nonextensible | restricted | aggregatable |
| bindable | helpstring | object | retval | defaultcollelem |
| call_as | hidden | odl | size_is | defaultvtable |
| case | id | oleautomation | string | helpstringcontext |
| control | ignore | optional | source | helpstringdll |
| custom | iid_is | out | switch_is | nonbrowsable |
| default | immediatebind | propget | switch_type | noncreatable |
| defaultbind | in | propput | transmit_as | range |
| defaultvalue | last_is | propputref | unique | replaceable |
| dispinterface | lcid | pointer_default | usesgetlasterror | uidefault |
| displaybind | length_is | ptr | uuid | |
| dual | licensed | public | v1_enum | |
| entry | local | readonly | version | |
| first_is | max_is | ref | vararg | |
| helpcontext | ms_union | requestedit | wire_marshal | |

A programmer can create a file having C++ source code with embedded IDL with the assistance of programming tools. Alternatively, a programmer can create such a file line by line.

III. Programming Environment

Figure 7:
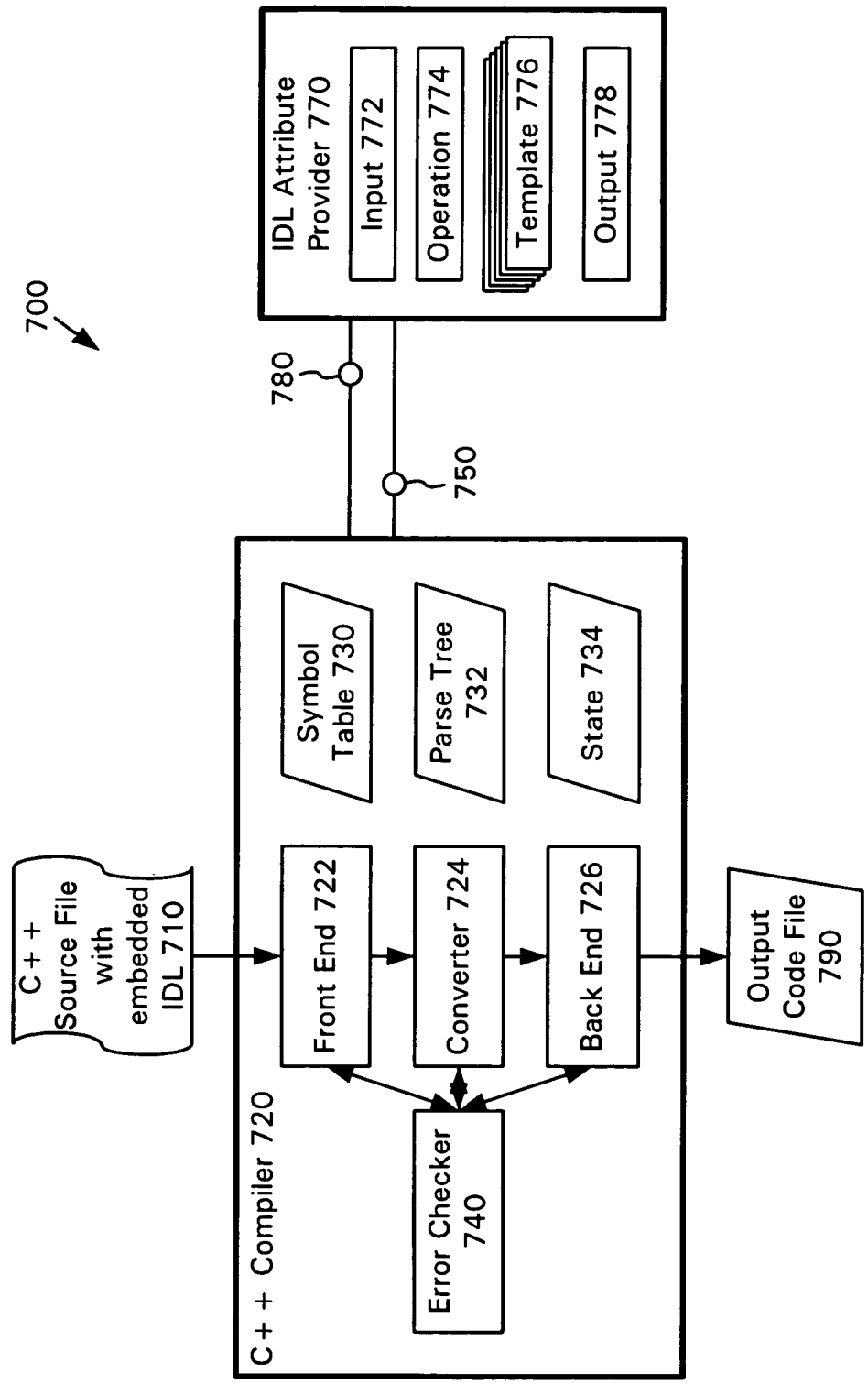
FIG. 7 is a block diagram of a C++ compiler that compiles C++ source code with embedded IDL in conjunction with an IDL attribute provider.

FIG. 7 shows a compiler environment 700 for recognizing embedded IDL constructs in C++ source code, creating a unified representation of the embedded IDL and C++ source code in a parse tree, and deriving semantic meaning from the embedded IDL. The compiler environment 700 also provides error detection for C++ source code with embedded IDL information. In alternative embodiments, another type of programming environment is used to process programming language code with embedded definition language information. For example, in one alternative embodiment, a Java compiler environment processes Java source code with embedded Java IDL to produce virtual machine instructions (e.g., bytecodes) for a Java object.

The compiler environment 700 includes a C++ compiler 720 that accepts a file 710 having C++ source code with embedded IDL. The compiler environment 700 processes the file 710 in conjunction with one or more IDL attribute providers 770, and outputs an output code file 790. Although FIG. 7 depicts a single IDL attribute provider 770, the compiler 720 can work with multiple IDL attribute providers (e.g., different providers for different IDL constructs). Alternatively, the functionality of the provider 770 can be merged with the compiler 720.

A front end module 722 reads and performs lexical analysis upon the file 710. Basically, the front end module 722 reads and translates a sequence of characters in the file 710 into syntactic elements, or "tokens," indicating constants, identifiers, operator symbols, keywords, punctuation, etc.

A converter module 724 parses the tokens into an intermediate representation. For tokens from C++ source code, the converter module 724 checks syntax and groups tokens into expressions or other syntactic structures, which in turn coalesce into statement trees. Conceptually, these trees form a parse tree 732. As appropriate, the converter module 724 places entries into a symbol table 730 that lists symbol names and type information used in the file 710 along with related characteristics. A symbol table entry for a particular symbol can have a list of IDL attributes associated with it.

If processing the listing of FIGS. 6a and 6b, for example, the compiler 720 recognizes brackets as delimiting an "export" IDL attribute to be processed as a unit. The following keyword enum denotes a user-defined type element. Within that element is definition for enum E, and so forth. In the symbol table 730, an entry for enum E has the "export" IDL attribute associated with it.

A state 734 tracks progress of the compiler 720 in processing the file 710 and forming the parse tree 732. For example, different state values indicate that the compiler 720 has encountered an IDL attribute, is at the start of a class definition or a function, has just declared a class member, or has completed an expression. As the compiler 720 progresses, it continually updates the state 734. The compiler 720 may partially or fully expose the state 734 to an outside entity such as the provider 770, which can then provide input to the compiler 720.

Based upon the symbol table 730 and the parse tree 732, a back end module 726 translates the intermediate representation of file 710 into output code. The back end module 726 converts the intermediate representation into instructions executable in a target processor, into memory allocations for variables, and so on. In FIG. 7, the output code is executable in a real processor, but in alternative embodiments the output code is executable in a virtual processor.

The front-end module 722 and the back-end module 726 can perform additional functions, such as code optimization, and can perform the described operations as a single phase or multiples phases. Except as otherwise indicated, the modules of the compiler 720 are conventional in nature, and can be substituted with modules performing equivalent functions.

In FIG. 7, the provider 770 indicates how to integrate tokens for IDL constructs into the intermediate representation, for example, adding IDL attributes to a symbol table entry for a particular symbol or manipulating the parse tree 732. Thus, embedded IDL information is associated with logically proximate programming language information in the symbol table 730 and the parse tree 732.

In FIG. 7, the provider 770 is external to the compiler 720, and communicates with the compiler 720 across the interfaces 750 and 780. FIG. 7 depicts a simplified interface configuration of the interface 750 exposed by the compiler 720 and the interface 780 exposed by the provider 770. Alternative interface configurations are possible.

The provider 770 includes several modules. An input module 772 receives a particular IDL attribute from a tag and parses it for parameters, values, properties, or other specifications. The interfaces 750 and 780 define how this information is passed between the compiler 720 and the provider 770.

An operation module 774 determines what must be done to implement the IDL attribute, and identifies locations where code is to be injected, or where other operations are to be carried out. "Injected code" typically includes added statements, metadata, or other elements at one or more locations, but this term also includes changing, deleting, or otherwise modifying existing source code. Injected code can be stored in the provider 770 as one or more templates 776, or in some other form. In addition, parse tree transformations may take place, such as altering the list of base classes or renaming identifiers.

An output module 778 communicates back to the compiler 720 to effect changes based upon the IDL attributes. In FIG. 7, the output module 778 directly manipulates internal compiler structures such as the symbol table 730 and the parse tree 732, creating symbols, adding to the parse-tree, etc. Alternatively, the output module 778 writes injected code to an external file (not shown) or send code directly to the compiler 720 as a stream of bytes (not shown) that the compiler 720 processes. Having an IDL attribute provider instruct the compiler (e.g., at converter module 724) to perform the operations gives a measure of security—the compiler 720 can reject or modify any request that would compromise proper functioning.

As the front end module 722 encounters IDL attribute tags in the file 710, the compiler 720 changes the state 734 appropriately and saves the IDL attribute tags in a list. This list also identifies the location of the provider 770 or any other needed attribute provider, as necessary acquiring location information from a utility such as a registry.

The compiler 720 communicates the state 734 to the provider 770. When the provider 770 detects a point at which it desires to perform an operation, it signals the compiler 720 and effects changes in one of the ways mentioned above. Thus, based upon the semantics of the embedded IDL, the provider 770 affects the states and structures of the compiler 720.

At various points during the processing of the file 710, an error checker module 740 checks for errors in the C++ source code with embedded IDL. In conjunction with the front end module 722, the error checker module 740 detects errors in lexical structure of C++ source code tokens and embedded IDL tokens. With converter module 724, error checker 740 detects any syntactical errors in the organization of C++ source code tokens and embedded IDL tokens. The error checker module 740 can also flag certain semantic errors in the embedded IDL in the C++ source code with embedded IDL.

Figure 8:
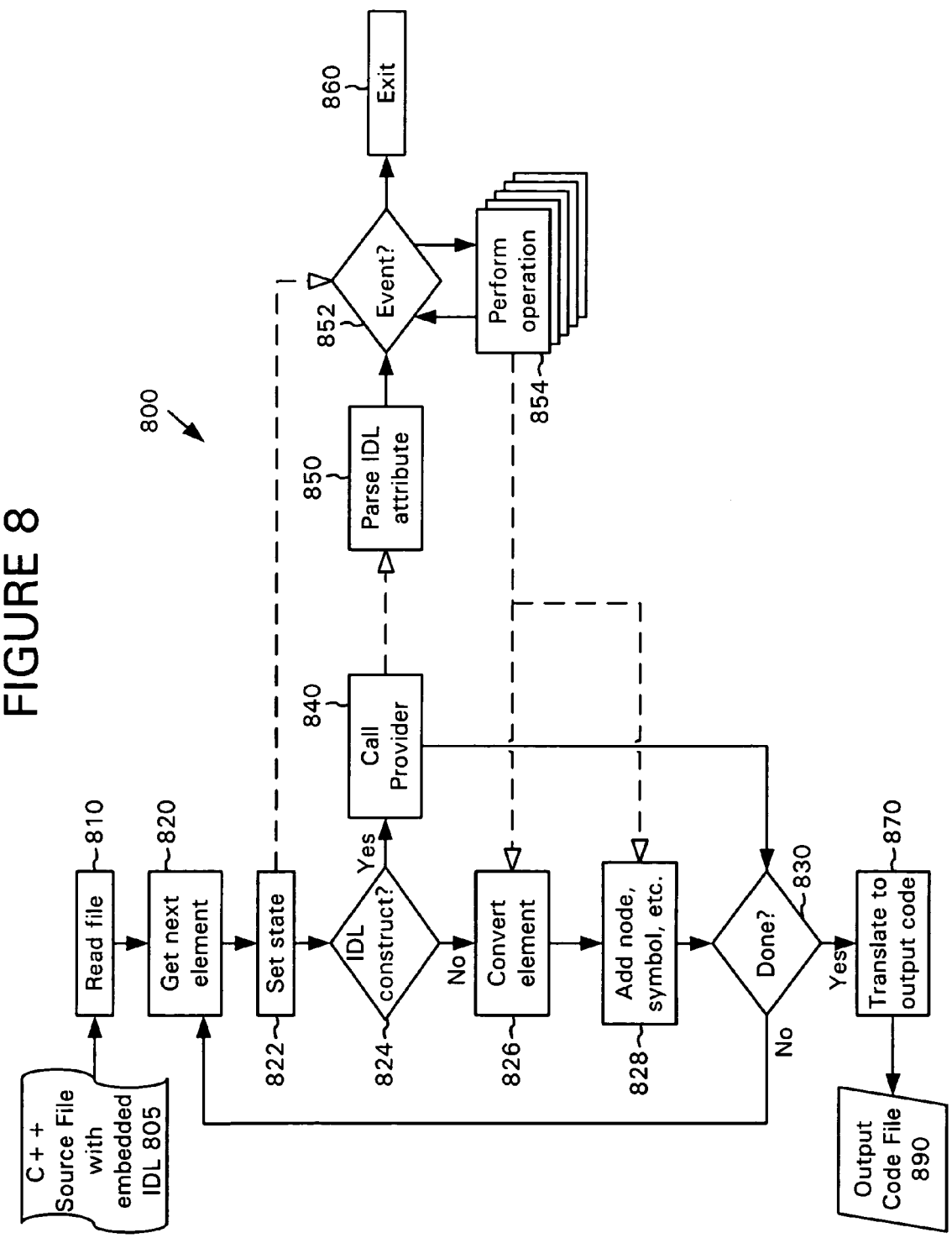
FIG. 8 is a flow chart showing compilation of a file having C++ source code with embedded IDL information.
Figure 9C:
Figure 9E:

FIG. 8 shows a technique 800 for processing IDL embedded in C++ source code in a compiler environment such as that shown in FIG. 7. Alternatively, technique 800 can be performed by a different configuration of modules.

After a compiler reads in (act 810) the file 805, the elements of the file 805 are processed. The compiler gets (act 820) a syntactic element of the file 805 and sets (act 822) an appropriate state for that element. The compiler determines (act 824) whether that element is for a conventional C++ construct or for an IDL construct.

If the current element is for a C++ construct, the compiler converts (act 826) that element into an intermediate language. As appropriate, the compiler handles (act 828) the element, for example, by placing a node in the parse tree or adding an entry to the symbol table. If the compiler determines (act 830) that the file 805 includes more elements, the compiler proceeds with the next element.

If the current element is for an IDL construct, the compiler gets attribute information for the IDL construct. The compiler calls (act 840) an IDL attribute provider, transmitting any parameters or other data accompanying the attribute in the construct. The IDL attribute provider parses (act 850) the passed IDL attribute information.

The IDL attribute provider executes concurrently with the compiler, and more than one IDL attribute provider can be active and executing concurrently during compilation. The IDL attribute provider is loaded upon encountering the first IDL attribute, and stays loaded for the duration of the compile operation. In this way, the IDL attribute provider acts as a domain-specific compiler plug-in that is called to parse constructs that are "registered" as part of its domain.

While executing concurrently with the compiler, the IDL attribute provider detects (act 852) the occurrence of designated events within the compiler, for example, events relate to the state of compilation (in FIG. 8, represented by a dashed arrow from act 822 to act 852). The compiler exposes a compilation state to the IDL attribute provider. Examining the state, the IDL attribute provider determines whether to do nothing or to perform (act 854) an operation. Thus, the IDL attribute provider can wait until the compiler reaches a certain state, and then perform an operation when that state is reached, for example, requesting the compiler to modify the parse tree. The IDL attribute provider then waits for another event.

The IDL attribute provider can perform different operations for different events that might occur within the compiler, and for different parameters transmitted with an IDL attribute. Among these operations are injection of statements or other program elements, possibly employing templates, and modifying or deleting code. Other operations include adding new classes, methods and variables, or modifying existing ones. Modification can include renaming and extending an object or construct. In FIG. 8, dashed arrows from act 854 to acts 826 and 828 represent the passing of code, state information, instructions, or other data to the compiler as described above.

Injected code is typically located remotely from where the IDL attribute appears in the C++ source code. Code can be injected at multiple locations as well. To clarify the significance of the injected code, comments around the injected code can identify the IDL attribute for which it was injected.

The scope of an IDL attribute is not bound to the scope of its associated C++ construct (variable, class, etc., see Table 1). Rather, the scope of an IDL attribute can extend beyond the point of its use. In most cases, however, an IDL attribute affects semantics in the context of its associated C++ construct. In FIG. 6a, for example, the "export" IDL attributes are coextensive with the scope of their respective type definitions, and the "dispinterface" IDL attribute operates over the ITest interface declaration.

When the file 805 has been completely processed, the compiler translates (act 870) the intermediate representation into output code 890 such as machine-language instructions, memory allocations, and other data required for a target processor. When the compiler finishes the compile operation, the IDL attribute provider exits (act 860).

IDL and programming languages evolve independently, and IDL typically changes more rapidly. Accordingly, using the "idl_quote" IDL attribute, the compiler can pass through new IDL attributes as IDL metadata for subsequent processing by an IDL compiler that understands the IDL attributes.

Although FIG. 8 depicts acts in a particular order, per conventional compiler techniques, many of these acts can be rearranged or performed concurrently. For example, the acts of reading the file, getting elements, determining significance, and translating to output code can be overlapped to some extent.

FIGS. 9a through 9f show a source code listing 900 representative of the output of the compiler environment of FIG. 7 upon processing the source code listing of FIGS. 6a and 6b. Because the listing 900 is in source code form, it is merely representative of the compiler output, which can be and typically is in a computer executable form.

FIGS. 9a through 9f show a representation of a compiler-generated implementation of an IDispatch interface for the interface ITest, which is described in the code portions 630 and 660 of FIGS. 6a and 6b. For the sake of presentation, the original C++ and bracketed IDL attributes are presented in boldface. The code generated based upon the semantics of the embedded IDL in the C++ source code is presented in lighter type.

Using conventional techniques, implementing dispatch interfaces in an object is notoriously difficult, as is implementing the client-side code for packing and unpacking variants. According to the illustrated embodiment, the compiler automatically generates IDispatch interface implementations as well as corresponding client-side code.

The IDispatch interface implementation of FIGS. 9a through 9f includes the method Invoke for invoking Grade or Score based upon a dispid, packed arguments, and other parameters. The implementation also includes the method GetIdsOfNames to associate the names Grade and Score with dispids, and the methods TypeInfoHelper, GetTypeInfoCount, and GetTypeInfo to provide type information to a client. For more information about IDispatch, see Kraig Brockshmidt, *Inside OLE*, second edition, Chapters 14 and 15, Microsoft Press (1995).

The compiler environment of FIG. 7 can also output client-side code for operating the IDispatch implementation of FIGS. 9a through 9f. Alternatively, the compiler environment generates other output code based upon combined IDL and programming language semantics.

IV. Creation of Binary Files

Figure 10A:
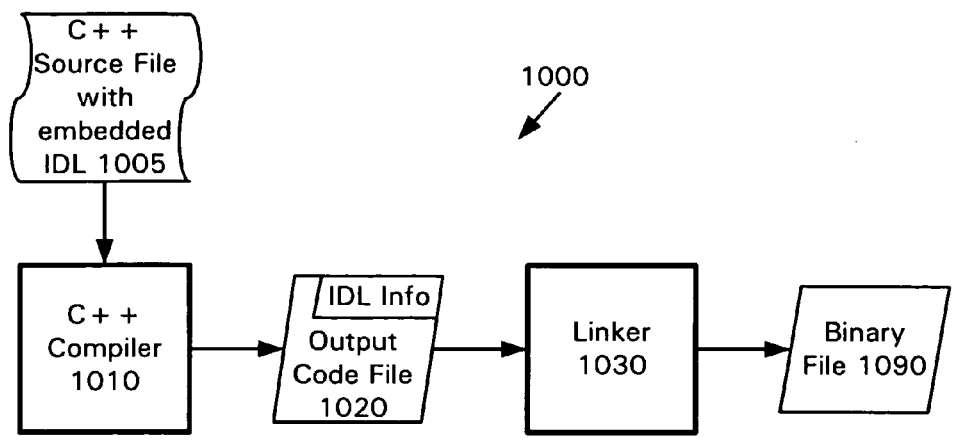
FIGS. 10a and 10b are block diagrams of a C++ compiler and a linker that create a binary file.
Figure 10B:
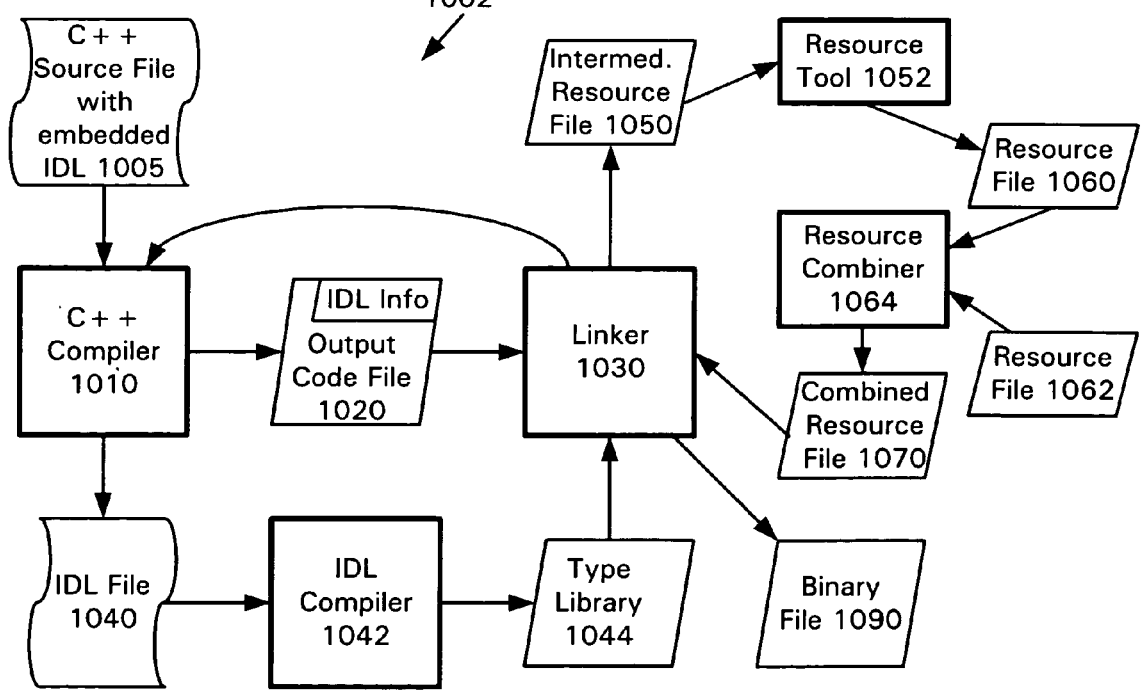

FIGS. 10a and 10b show the creation of a binary file 1090 from a file 1005 having C++ source code with embedded IDL. FIG. 10a shows a high-level view of the process 1000 of creating a binary file 1090, while FIG. 10b shows one particular implementation 1002. In alternative embodiments, other types of files are created from a programming language file with embedded definition language information. For example, in one alternative embodiment, a Java compiler environment facilitates creation of a Java file such as a Java Archive ["JAR"] file from a Java source code with embedded Java IDL.

With reference to FIG. 10a, a programmer has one or more files 1005. A C++ compiler 1010 converts the one or more files 1005 into one or more output code files 1020 that include fragments of IDL information. Next, a linker 1030 generates a binary file 1090, such as an executable or dynamic link library, from the one or more output code files 1020 with fragments of IDL information. Compared to multi-phase, multi-file techniques, the process 1000 simplifies creation of binary files for the programmer by combining IDL and programming language code into a single file and by automating the process 1000 after the programmer initiates the process 1000.

In one embodiment, based upon the files 1005 the compiler 1010 generates a type library and other output files conventionally generated by an IDL compiler. A drawback to this embodiment, as mentioned above, is that IDL technology historically has evolved apart from compiler technology. Different groups might develop the compiler and the IDL, so the compiler might not be up to date. Still another group might develop the linker.

To let the compiler exploit semantic knowledge of IDL while preserving the independence of the IDL, after deriving semantic meaning from embedded IDL, the compiler can output the embedded IDL as IDL metadata, which is then supplied to an IDL compiler. FIG. 10b shows such an embodiment.

In FIG. 10b, the linker 1030 takes the fragments of IDL information from the output code files 1020. The linker passes the IDL fragments to the compiler 1010, which generates a collective IDL file 1040. The compiler 1010 embeds debugging information in the IDL file 1040, so subsequent error messages from an IDL compiler can be associated with appropriate embedded IDL in C++ source code.

The linker 1030 then calls an IDL compiler 1042, which generates a type library file 1044. The linker 1030 next generates an intermediate resource file 1050 such as an RC file and embeds the type library file 1044 in the intermediate resource file 1050. The linker 1030 calls a resource tool 1052 such as a resource compiler, which generates a resource file 1060 such as a RES file. Next, the linker 1030 calls a resource file combiner 1064 that combines the resource file 1060 and any related resource files (e.g., resource file 1062) into a combined resource file 1070. Taking the combined resource file 1070, the linker 1050 produces a binary file 1090.

Separating these activities as described in FIG. 10b facilitates separate development and control of the various components. On the other hand, many of the activities of FIG. 10b could be consolidated without departing from the high level view of FIG. 10a. For example, the compiler 1010 could pass a representation of embedded IDL directly to the IDL compiler 1042 instead of placing IDL fragments in the output code files 1020 and subsequently generating the IDL file 1040.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer readable medium having stored thereon a computer executable compiler system that performs semantic analysis of interface definition language constructs embedded in programming language code in a file, the compiler system comprising:
    a front end module that separates a file into plural tokens, the file including programming language code having embedded therein interface definition language constructs;
    a converter module that converts the plural tokens into an intermediate representation, wherein the intermediate representation includes a symbol table and a tree that unifies representation of the programming language code and the embedded interface definition language constructs,
wherein at least some of the embedded interface definition language constructs are represented in the tree without creating new programming language code for the at least some of the embedded interface definition language constructs, wherein the symbol table includes plural entries for symbol names for the programming language code, and wherein at least one of the plural entries has an associated list of definition language attributes; and
    a back end module that produces output computer-executable code from the intermediate representation based at least in part upon semantics of the embedded interface definition language constructs.

2. The computer readable medium of claim 1 wherein the compiler system further comprises a definition language attribute provider that modifies the intermediate representation based upon the semantics of the embedded interface definition language constructs.

3. The computer readable medium of claim 1 wherein the compiler system further comprises an error checker module that checks for lexical, syntactic, and semantic errors in the file.

4. The computer readable medium of claim 1 wherein the backend module also produces output interface definition language information in an output file that includes the output computer-executable code.

5. The computer readable medium of claim 1 wherein the backend module also produces output interface definition language information in a separate output file from the output computer-executable code.

6. The computer readable medium of claim 1 wherein the output computer-executable code is computer-executable instructions for a real processor.

7. The computer readable medium of claim 1 wherein the output computer-executable code is computer-executable instructions for a virtual processor.

8. The computer readable medium of claim 1 wherein the programming language code is in C++ and wherein the embedded interface definition language constructs includes IDL constructs.

9. The computer readable medium of claim 1 wherein the embedded interface definition language constructs include an export attribute, wherein the export attribute annotates a user-defined data type, and wherein the compiler system outputs interface definition language metadata for the user-defined data type based at least in part upon the export attribute.

10. The computer readable medium of claim 1 wherein the embedded interface definition language constructs include an interface type attribute, wherein the interface type attribute annotates an interface, and wherein the output computer-executable code includes implementation code for an implementation of the interface.

11. The computer readable medium of claim 10 wherein the interface is a standard COM interface, dispatch interface, or dual interface, and wherein the implementation code is for an object that exposes the interface.

12. The computer readable medium of claim 10 wherein the back end module uses directional attributes for arguments of member functions of the interface to produce the implementation code, and wherein the directional attributes include one or more of in, out, and retval.

13. The computer readable medium of claim 1 wherein the embedded interface definition language constructs includes a project attribute.

14. The computer readable medium of claim 1 wherein a definition language attribute provider reacts to plural events during compilation of the file by causing modification of the intermediate representation, wherein at least one of the plural events, in reaction to which the definition language attribute provider causes modification of the intermediate representation, occurs during processing of the embedded interface definition language constructs, and wherein at least one of the plural events, in reaction to which the definition language attribute provider causes modification of the intermediate representation, occurs during processing of the programming language code.

15. A computer executable compiler system stored in a computer system that creates a unified programming language and interface definition language parse tree from a file comprising a mix of programming language constructs and interface definition language constructs, the compiler system comprising:
    a front end module that separates a file into plural tokens, the file comprising a mix of programming language constructs and interface definition language constructs; and
    a converter module that converts the plural tokens into an intermediate representation comprising a symbol table and a parse tree, wherein:
        the symbol table includes plural entries for symbol names for the programming language constructs, at least one of the plural entries having an associated list of interface definition language attributes;

the parse tree unifies representation of the programming language constructs and the interface definition language constructs; and at least some of the interface definition language constructs are represented in the parse tree without creating new programming language constructs for the at least some of the interface definition language constructs.

16. The compiler system of claim 15 wherein the front end module recognizes a delimiting character that distinguishes interface definition language tokens from programming language tokens.

17. The compiler system of claim 15 further comprising an error checker module that performs lexical and syntactic checks on the file.

18. A computer readable medium having stored thereon a data structure representing a unified interface definition language and programming language parse tree for a file having a combination of programming language code and embedded interface definition language constructs, the data structure comprising:

a first data field storing data representing a symbol table that has plural entries, each of the plural entries corresponding to a symbol name for programming language code of a file having a combination of programming language code and embedded interface definition language constructs, at least one of the plural entries having an associated list of interface definition language attributes based upon the embedded interface definition language constructs; and a second data field storing data representing a parse tree, wherein the parse tree unifies representation of the programming language code and the embedded interface definition language constructs; and wherein at least some of the embedded interface definition language constructs are represented in the parse tree without creating new programming language code for the at least some of the embedded interface definition language constructs.

19. A computer readable medium having stored thereon instructions for performing a method of creating a unified programming language and definition language tree from a file that includes interface definition language constructs embedded in programming language code, the method comprising:

separating a file into plural tokens, the file including interface definition language constructs embedded in programming language code;

building a symbol table having plural entries for symbol names for the programming language code, at least one of the plural entries having an associated list of definition language attributes based upon the embedded interface definition language constructs; and building a tree that unifies representation of the embedded interface definition language constructs and the programming language code, wherein the building comprises representing at least some of the embedded interface definition language constructs in the tree without creating new programming language code for the at least some of the embedded interface definition language constructs.

20. The computer readable medium of claim 16 wherein the separating comprises recognizing a delimiting character that distinguishes definition language tokens from programming language tokens.

* * * * *